Oct. 18, 1960
C. B. ROGERS ET AL
2,956,835
LOCKING DEVICE FOR FREIGHT CARRIER
Filed Sept. 6, 1957
5 Sheets-Sheet 1
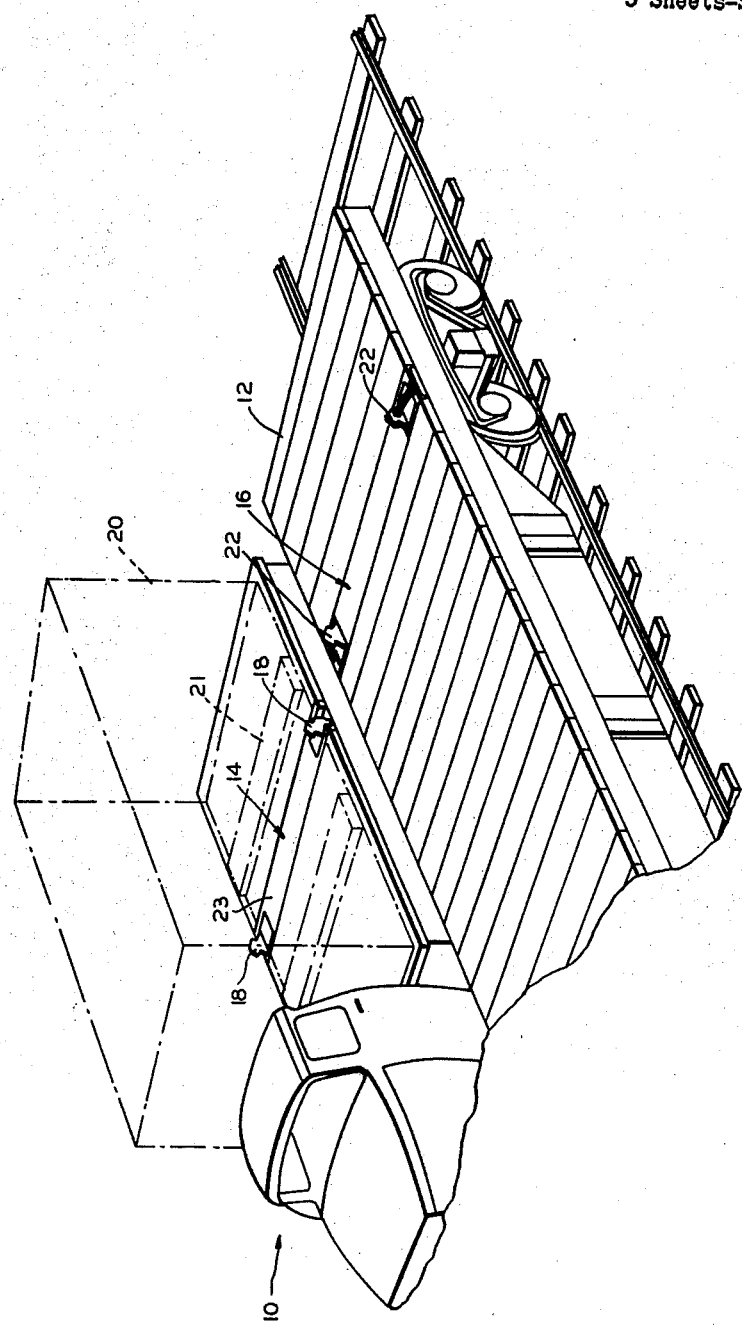
INVENTORS.
DALE W. McKEE
CYRIL B. ROGERS
BY
*J.C. Wiessler*
ATTY.

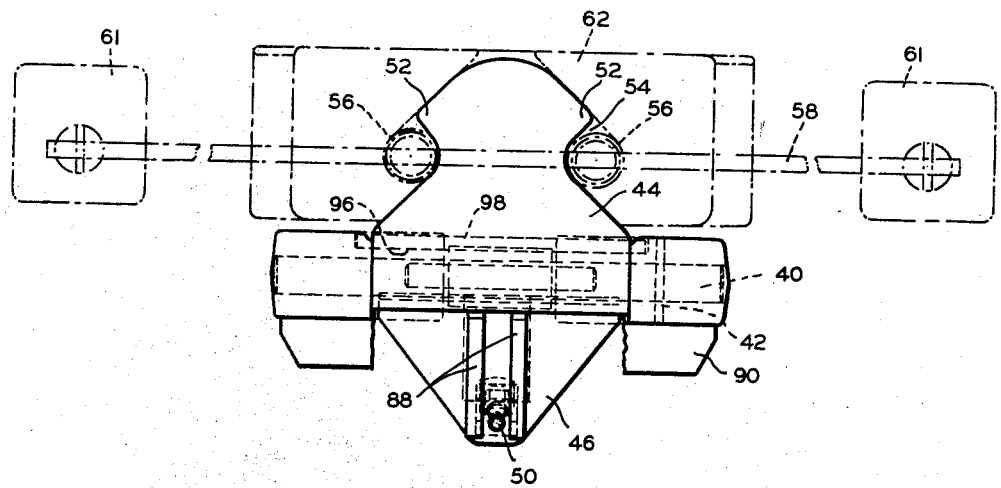
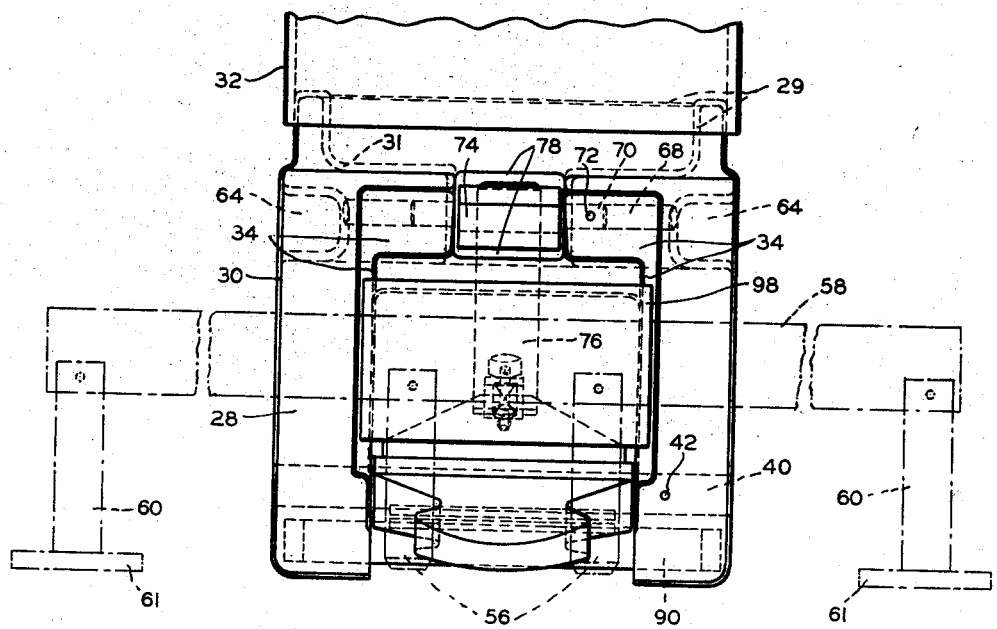

Oct. 18, 1960    C. B. ROGERS ET AL    2,956,835
LOCKING DEVICE FOR FREIGHT CARRIER
Filed Sept. 6, 1957    5 Sheets-Sheet 3

INVENTORS.
DALE W. MCKEE
CYRIL B. ROGERS
BY J.C. Wiessler
ATTY.

Oct. 18, 1960 C. B. ROGERS ET AL 2,956,835
LOCKING DEVICE FOR FREIGHT CARRIER
Filed Sept. 6, 1957 5 Sheets-Sheet 4

INVENTORS.
DALE W. MCKEE
CYRIL B. ROGERS
BY
ATTY.

Oct. 18, 1960  C. B. ROGERS ET AL  2,956,835
LOCKING DEVICE FOR FREIGHT CARRIER
Filed Sept. 6, 1957  5 Sheets-Sheet 5

INVENTORS.
DALE W. MCKEE
CYRIL B. ROGERS
BY
ATTY.

United States Patent Office 2,956,835
Patented Oct. 18, 1960

2,956,835

LOCKING DEVICE FOR FREIGHT CARRIER

Cyril B. Rogers, Jackson, and Dale W. McKee, Battle Creek, Mich., assignors to Clark Equipment Company, a corporation of Michigan Filed Sept. 6, 1957, Ser. No. 682,391

6 Claims. (Cl. 296—35)

This invention relates to the handling and transporting of freight, and more particularly concerns the provision of improved means for effectively associating and disassociating suitable portable freight carrier means with transporting means, such as freight cars and truck trailers.

The present application constitutes an improvement of the copending U.S. application Serial No. 577,118 entitled "Freight Handling Means and Method," filed April 9, 1956, in the name of Jack E. Loomis (common assignee), said copending application constituting a continuation-in-part of a prior application, now abandoned, filed August 30, 1955, under Serial No. 531,489.

The above identified copending continuation-in-part application describes in detail novel method and means for the handling and transporting of freight in a variety of designs and sizes of portable freight carrier means (depending on the character of the freight to be transported), and of various embodiments of latching mechanisms in the base portion of such freight carrier means which are adapted to be associated with suitable anchor means in the carrier supporting surface of the transporting means. The anchor or retaining means which is associated with the carrier supporting surface of the transporting means preferably acts as a guide when in an operative position for positioning the freight carrier on the carrier supporting surface, and may be disposed at an inoperative position below the level of the carrier supporting surface so that the transporting means may be used in a conventional manner, if required. The copending application also discloses a method of handling such freight carriers by load lifting and handling mechanisms such as fork lift trucks, straddle trucks and cranes, and of means associated with such materials handling mechanisms whereby such mechanisms in addition to effecting loading and unloading of the freight carrier relative to the carrier supporting surface also serves to effect latching and unlatching of the aforementioned latch mechanism relative to the anchor mechanism of the carrier transporting means.

This invention is particularly concerned with improvements in anchor mechanisms which are associated with the carrier supporting surface of the transporting means in a freight handling system as above briefly described.

Accordingly, it is an object of our invention to provide improved anchor mechanisms for the purposes hereinbefore described which are operable to permit movement of a freight carrier means from a carrier supporting surface of one transporting means to the carrier supporting surface of another transporting means, such for example as from a flatbed truck trailer to a railroad flatcar or viceversa, without necessitating any lifting of the freight carrier means, as with a fork lift truck, straddle truck or overhead crane.

Now, in order to acquaint those skilled in the art with the preferred manner of practicing our invention, we shall describe such in connection with the accompanying drawings wherein:

Figure 1 is a schematic representation in perspective showing the use of our invention with a railroad flatcar and a flatbed truck trailer;

Figure 2 is a front view in elevation of one embodiment of our invention which is particularly adapted for use with a road borne transporting means, such as a flatbed truck trailer;

Figure 3 is a plan view of the anchor mechanism shown in Figure 2;

Figure 6:
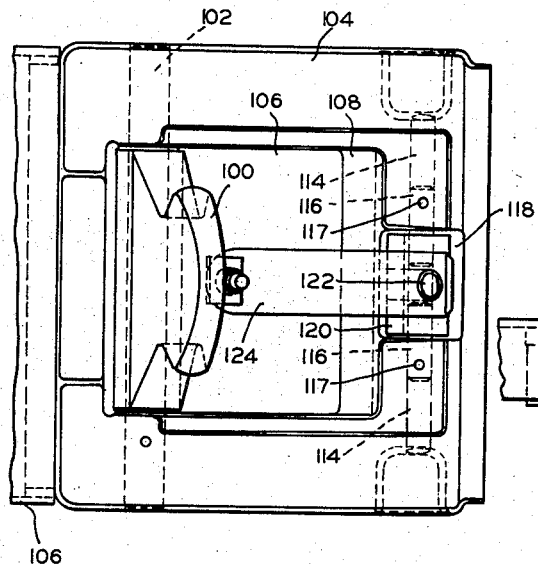
Figure 4:
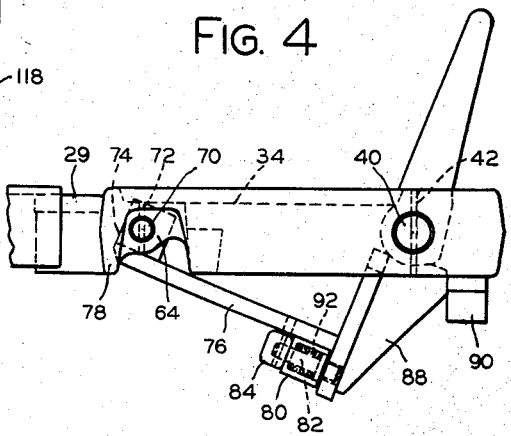
Figure 8:
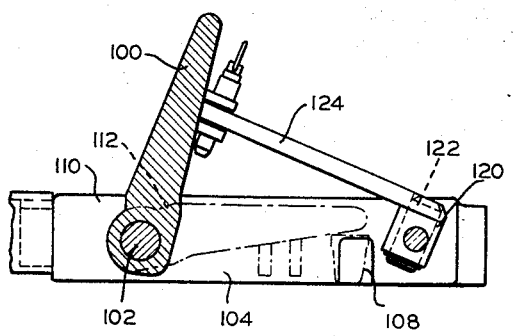
Figure 7:
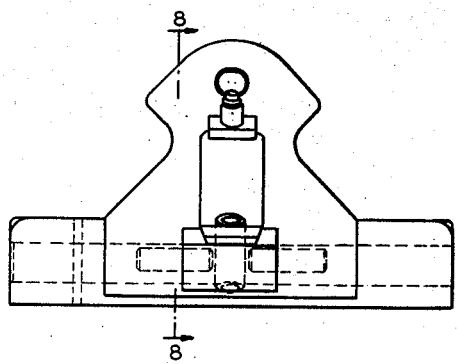
Figure 5A:
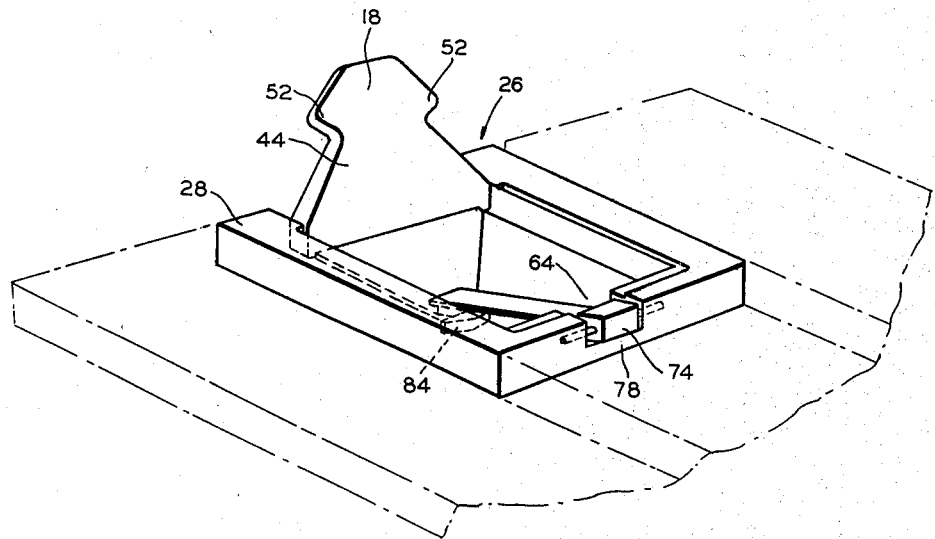
Figure 5B:
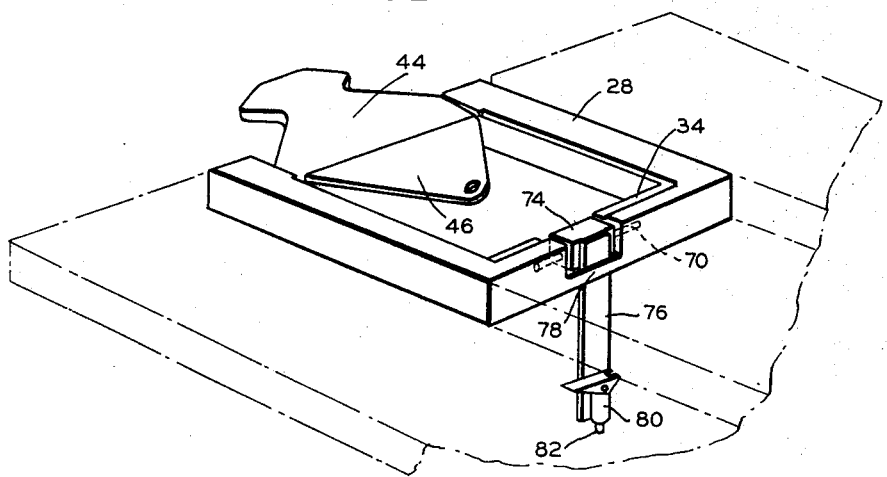

Figures 2 and 3 include in phantom view a portion of latching mechanism adapted for locking association with the anchor mechanism and adapted to be secured to the bottom side of a freight carrier means;

Figure 4 is a view in side elevation of the anchoring mechanism shown in Figures 2 and 3;

Figures 5A and 5B are views in perspective of the anchor mechanism shown in Figures 2-4 taken in two operative positions;

Figure 6 is a plan view of an anchor mechanism particularly adapted for association with a rail borne transporting means, such as a railroad flatcar;

Figure 7 is a front view in elevation of the mechanism shown in Figure 6;

Figure 8 is a sectional view taken along line 8—8 of Figure 7; and

Figure 9A:
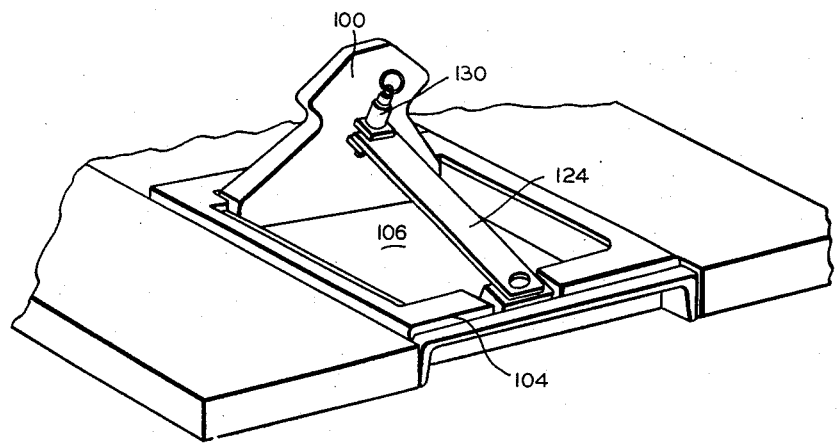
Figure 9B:
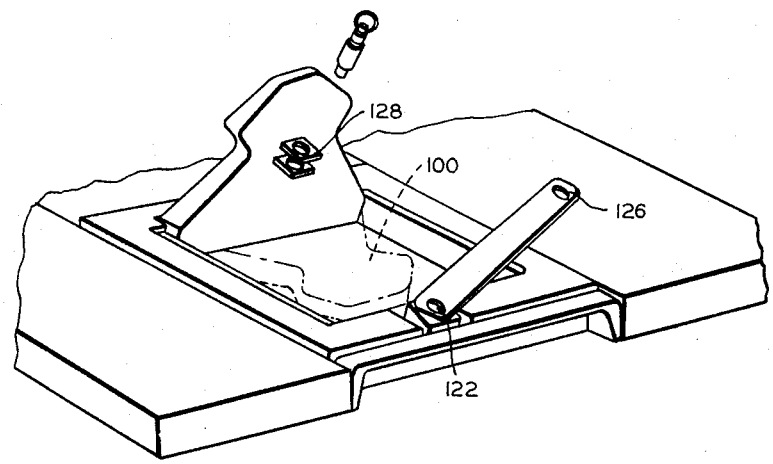

Figures 9A and 9B are views in perspective of the anchor mechanism shown in Figures 6-8 illustrating various operative positions thereof.

Referring now in detail to the drawings and first to Figure 1, a tractor-trailer unit shown generally at numeral 10 is located immediately adjacent a railroad flatcar 12 so that an anchor device 14 of the trailer is longitudinally aligned with an anchor device 16 of the railcar. The anchor device 14 includes a pair of laterally spaced and outwardly pivotable anchor plates 18 which are constructed to receive and lockingly engage with latching mechanism of a freight carrier 20, as shown in part in phantom view in Figures 2 and 3. The anchor device 16 likewise includes a pair of laterally spaced and outwardly pivotable anchor plates 22 which are engageable with said latching mechanism for anchoring the freight carrier to the rail car.

The freight carrier 20 may include transversely extending pockets adjacent the bottom surface thereof, such as illustrated at numeral 21, for permitting load engaging means of a materials handling device, such as the fork tines of a fork lift truck, to be inserted into said pockets and automatically disengaging latching means from the anchor device 14 or 16 for permitting lifting of the freight carrier above the transport means and moving same to a desired location. The construction of the freight carrier 20 and the latching mechanism which is associated therewith form no part of the present invention and are fully disclosed in the above identified copending application.

Referring now to Figures 2-4, 5A and 5B, an outboard folding anchor device is illustrated which is particularly adapted for use with a flatbed trailer such as is shown at numeral 10. The anchor device 14 includes a centrally located and transversely extending downwardly opening channel member 23 which functions as an integral part of the transporting surface of the trailer and which terminates at its opposite ends in outboard folding anchor mechanisms 26, each of which includes an anchor plate 18. Each anchor mechanism 26 comprises generally an outwardly opening U-shaped member 28 which terminates at its inward end in a supporting portion 29 which is secured, as by welding, to the inner surface of the legs and base of the end portion of the channel member 32 and which includes extensions 30 and 31 secured to the outer vertical marginal surfaces of the U-shaped member 28. Each of the U-shaped members 28 includes adjacent the inner vertical marginal surface thereof a depressed portion which provides a ledge 34. Adjacent the open end of each member 28 is mounted a pivot shaft 40 which extends between and through the legs of member 28 which is provided with axially aligned openings in the outer portions of the legs thereof. Vertically alignable openings in the one leg of member 28 and in pivot shaft 40 receive a pin member 42 which holds the pivot shaft in a fixed position.

Each anchor plate 18 is formed of a normally upwardly extending anchor portion 44 and of a normally downwardly depending holding portion 46, said anchor and holding portions together forming the generally diamonded-shape plate 18. Centrally of each anchor plate is formed an opening adapted to receive the pivot shaft 40 for pivotal mounting of said plate between the legs of the member 28. The holding portion 46 includes an opening 50 adjacent the apex thereof for a purpose to be explained. The anchor portion 44 includes projecting ear portion 52 adjacent its upper end, thereby forming suitable recesses 54 beneath such ear portions for receiving locking pins 56 of a freight carrier latching mechanism.

The latching mechanism, a portion only of which is shown in Figures 2 and 3, includes, in addition to the locking pins 56, a bar 58 to which the pins 56 are secured and at opposite ends of which is supported a pair of finger members 60 having enlarged ends 61. The ends 61 of finger members 60 are engageable by abutment means located on a fork lift truck, straddle carrier or other material handling device for disengaging the locking pins 56 from the recesses 54 under the ear portions 52, whereby the freight carrier 20 may be disengaged from the anchor plates 18 of the conveyance, as fully described in the above mentioned copending application. A center block member 62 is also a part of the latching mechanism and includes surfaces complementary to surfaces in the upper portion of the anchor plate 18 for mating therewith when engaged, as shown best in Figure 2. As aforementioned, the latching mechanism forms no part of the present invention, but is briefly described herein for the purpose of clarifying the utility of the anchor devices 14 and 16.

In the base of each U-shaped member 28 at opposite sides thereof are formed irregularly shaped slotted portions 64. An opening 68 extends through the base of each member 28 and terminates or opens into at opposite ends thereof the slots 64. Each opening 68 is adapted to receive a pivot shaft 70 which is held in fixed position therein by means of a pin 72. Pivotally mounted upon the pivot shaft 70 between opposite side portions of the base is a block member 74, from the inner side of which depends an arm 76 which is adapted to be pivoted with the block member in either direction about shaft 70. When the arm 76 depends substantially vertically downwardly from the pivot shaft 70, as best shown in Figure 5B, it abuts an inner surface of a connecting member which connects the portions of the base of member 28 on opposite sides of block member 74. Located at the outer end of arm 76 is a bracket 80 in which is mounted a spring loaded pin 82 having a handle portion 84, said pin 82 being registrable with the opening 50 in anchor plate portion 46 when the arm 76 is rotated from the position shown in Figure 5B to that shown best in Figures 4 and 5A and the anchor device 18 is in its operative position for receiving the latching mechanism connected to the freight carrier 20. A pair of triangular ribs 88 located on the outer side of each plate portion 46 abut a stop member 90 which depends from the lower surfaces of the forward portions of the legs of each member 28 when the anchor device 18 is in its operative position (Figure 4). Subsequent rotation of the arm 76 from the position of Figure 5B to that of Figure 5A will bring into registry the projecting portion of pin 82 with opening 50.

Each anchor plate may be rotated to the position of Figure 5B by retracting the pin 82 against the force of the spring, thereby permitting the arm member 76 to pivot vertically downwardly and anchor plate portions 44 and 46 to pivot outwardly and inwardly, respectively, to a position of abutment with stop member 90 wherein the upper surface of the anchor plate is somewhat below the upper surface of the U-shaped member 28.

A cover plate 98 may be placed upon the ledge 34 in either position of the anchor plate in order to cover the openings in opposite ends of the anchor device 14 and to provide a flush transporting surface.

Referring now to Figures 6–8, 9A and 9B, a modification of the above described construction is illustrated. This modified arrangement is particularly adapted for use with railway flatcars and is shown in conjunction therewith in Figure 1. In this modified arrangement, which performs the same anchoring function as the construction above described and which is also of the outboard folding type, an upwardly extending anchor plate 100 is mounted at the base end thereof upon a transversely extending pivot shaft 102 which extends through the inboard side of a generally open square-shaped member 104. A transversely extending downwardly opening channel member 106 of the anchor device 16 is secured at its opposite ends to the inboard side of members 104 in a manner similar to the securing of U-shaped member 28 to channel 32. The anchor plate 100 can be pivoted on shaft 102 a total of something less than 90 degrees within the open center portion 106 of member 104, the permissible angular movement of plate 100 being limited by a bar 108 which extends between the longitudinally spaced sides of member 104 and functions as a stop member for plate 100 when the plate is rotated to its non-anchoring or inoperative position. When the plate is rotated to its anchoring or operative position, maximum upward movement thereof is limited by means of an overhanging lip portion 110 of the inboard side of each member 104, which lip portion mates with a correspondingly shaped section 112 of the base portion of each plate 100. The operative and inoperative positions of the anchor plate are illustrated in both Figures 8 and 9B.

The outer end portion of square-shaped member 104 is formed to provide openings 114 for receiving a pair of axially aligned and longitudinally spaced pivot pins 116 which are held in fixed positions within openings 114 by pin members 117. The pivot pins 116 extend toward each other into a slot 118 formed in the outer side of member 104, and mounted upon the facing end portions of pivot pins 116 within slot 118 is a block member 120. Extending downwardly through the block member 120 between the facing ends of pivot pins 116 is an upwardly extending pivot pin 122 upon the upper end of which is secured an arm 124 which terminates at its opposite end in an opening 126. The arm 124 may be pivoted about the axis of pivot pins 116 with block member 120, and also about the upwardly extending axis of pivot pin 122 independently of block member 120, as shown in Figure 9B.

Extending outwardly from the outer surface of anchor plate 100 is a pair of bracket members 128 having openings therein which are adapted to be aligned with the opening 126 when the arm member 124 is swung upwardly and inwardly to the position shown in Figure 9A, wherein a locking pin 130 may be inserted through the openings to maintain the position of arm 124. When in this position, the arm holds anchor plate 100 in its operative position; when the pin 130 is removed, the arm 124 may be swung to the position shown in Figure 9B about the axis of pin 122 and the anchor plate 100 then pivoted to the dotted line position illustrated in Figures 8 and 9B, whereafter the arm may be returned to its central position and pivoted with block member 120 to overlie anchor plate 100. When in such an overlying position the arm is substantially flush with the upper surface of the square-shaped member 104.

The anchor plate 100 is preferably of the same general form as the upper anchor plate portion 44 of anchor plate 18. The latching mechanism associated with freight carrier 20 is adapted to be associated and disassociated with anchor plate 100 as with anchor plate 18.

In operation, it will now be apparent that both of the anchor devices 14 and 16 above described are so constructed that the anchor plates 18 and 100, respectively, may be pivoted outwardly of the conveyance or transporting means when it is desired to remove a freight carrier from one or the other of the conveyances. This arrangement has a distinct advantage over inboard folding anchor plates which are constructed to pivot inwardly of the conveyance to a flush position with the transporting surface thereof. For example, at small switching terminals whereat only a very few freight carriers may be required to be transferred from railway flatcars to flatbed truck trailers, or vice-versa, in a relatively long period of time, it may not be desirable to invest in large materials handling devices, such as fork lift trucks, for the purpose of performing the transfer operation. However, with an inboard folding anchor device it is not possible to transfer a freight carrier from one conveyance to another without utilizing a lifting device for the purpose of disengaging the freight carrier from the conveyance. This results from the fact that structural parts of a freight carrier interfere with any attempt to pivot the anchor plates inwardly thereof. On the other hand, with our construction, the anchor plates may be pivoted outwardly of the freight carrier without interference, thereby permitting the freight carrier to be moved sidewise or skidded without lifting from one conveyance to another. In such an operation manual means may be provided for actuating inwardly of the freight carrier the locking pins 56 for disengaging same from the anchor plates, following which, in the case of anchor device 14, the spring loaded pin 82 is disengaged from the opening 50 in each anchor plate portion 46 and the anchor plate portions 44 thereafter pivoted outwardly of the conveyance to the position shown in Figure 5B against stop member 90, following which each arm 76 is pivoted downwardly against its stop 78. Similarly, disengagement of the locking pins 56 from the anchor plates 100 permits said anchor plates to be pivoted outwardly as hereinbefore described to the dotted line position shown in Figure 9B whereat each pivoted bar member 124 may be returned to a central overlying position as hereinbefore described.

With the anchor plates of anchor mechanisms 18 and 22 pivoted outwardly as aforesaid any suitable actuating means, such as a portable winch and cable arrangement or a small truck which may be connected to the freight carrier by cable or other means, may be utilized for skidding sidewise the freight carrier from one conveyance to the other. In such an operation, of course, it is important to align the latching mechanism of the freight carrier with the anchor device of the conveyance to which the freight carrier is moved. Following transfer of the freight carrier from the truck-trailer 10 to the railway flatcar 12, for example, the anchor plates 100 may be returned to an operative position by first pivoting each bar member 124 upwardly and outwardly to the position shown in Figure 9B, then pivoting each anchor plate upwardly and inwardly against stop members 110, and finally connecting each bar member 124 to the respective bracket 128 by means of the pins 130. The locking pins 56 of the feright carrier latching mechanism may then be returned to locked relation between each anchor plate 100 and the center block 62 of the latching mechanism.

From the above it will be readily seen that we have provided simple outboard folding anchor mechanism for attachment to various types of freight carrier conveyances, said anchor mechanism being so constructed as to permit disengagement of a freight carrier therefrom either by means of sliding the carrier sidewise from one conveyance to another without lifting or by utilizing known materials handling devices for lifting the carrier from one conveyance and transporting same to another.

Although we have described but two embodiments of the invention it will be apparent to persons skilled in the art that modifications may be made without departing from the scope of our invention.

We claim:

1. A mechanism for use in latching a freight carrier to a conveyance comprising an elongated structure having a flat upper surface adapted to be secured to the top of the conveyance in transverse relation thereto, a pair of anchor plate members pivotally mounted on the said elongated structure adjacent the opposite ends thereof, each anchor plate member being arranged to be positioned selectively in an upwardly extending position and pivoted outwardly therefrom to a retracted position adjacent the said flat upper surface, each anchor plate member including a portion depending downwardly from the pivoted connection thereof to said elongated structure, an arm member pivoted substantially centrally of the elongated structure adjacent each end thereof projectable angularly toward the downwardly depending portion of each anchor plate member, and means associated with each said downwardly depending portion and each said arm means for positively connecting the arm means to the anchor plate member for maintaining the latter in its upwardly directed position.

2. A mechanism as claimed in claim 1 wherein each arm member depends downwardly from its pivoted connection to the elongated structure and is pivotable upwardly from said position to positively engage the downwardly depending portion of the anchor plate member.

3. An anchor mechanism for a conveyance for securing a freight carrier thereto comprising a horizontally disposed member having a flat upper surface and adapted to be secured to the top of the conveyance, opposite end portions of said member having openings therein, an anchor plate member pivotally connected to each end portion of the horizontal member and movable between upwardly directed and retracted positions adjacent said opening, each anchor plate member having coplanar portions extending in opposite directions from the pivoted connection thereof to said horizontally disposed member, the upper and lower portions of said anchor plate member being pivotable outwardly and inwardly, respectively, of the horizontally disposed member when actuated from its upwardly extending position to its retracted position, and arm means pivoted to each end portion adjacent said opening therein and in confronting relation to said anchor plate member, said arm member being pivotable to positively engage the lower portion of the anchor plate member when the anchor plate member is disposed in an upwardly extending position, whereby to receive and cooperate in anchoring to the conveyance a freight carrier.

4. An anchor mechanism as claimed in claim 3 wherein stop means are provided for predetermining the position of each anchor plate member when it is pivoted to either its upwardly extending or retracted position.

5. A mechanism for use in anchoring a freight carrier having latching mechanism associated therewith to a conveyance comprising an elongated structure having a flat upper surface adapted to be secured to the top of the conveyance in transverse relation thereto, a mounting member having an open center section secured at each end of the elongated structure, an anchor plate member pivotally mounted on one side of each mounting member, each anchor plate member being arranged to be positioned selectively about its pivotal mounting in an upwardly extending position above said flat upper surface and outwardly therefrom to a retracted position coplanar with the open center section of its respective mounting member, each anchor plate member having a portion depending downwardly from the pivoted connection thereof to said mounting member, an arm member pivotally mounted on each mounting member on the side thereof opposite the mounting of each anchor plate member, each said arm member being projectable angularly with respect to said flat upper surface and out of coplanar relation with the mounting member toward said downwardly depending portion of each anchor plate member when each anchor plate member is located in an upwardly extending position, and means associatable with said downwardly depending portion of each anchor plate member and with each arm member for positively connecting each arm member to its respective anchor plate member for maintaining the anchor plate member in its upwardly extending position, said latching mechanism being matable in overlying complementary relation to each anchor plate member when the latter is disposed in its upwardly extending position so as to secure the freight carrier against movement in any direction relative to the conveyance.

6. A mechanism as claimed in claim 5 wherein each arm member depends downwardly from its pivoted connection to the mounting member and is pivotable upwardly from said position to positively engage the downwardly depending portion of the anchor plate member.

References Cited in the file of this patent

UNITED STATES PATENTS

| | | |
|---|---|---|
| 841,500 | Flynn | Jan. 15, 1907 |
| 2,114,707 | Fitch et al. | Apr. 19, 1938 |
| 2,469,760 | Berry | May 10, 1949 |
| 2,846,264 | Loomis | Aug. 5, 1958 |